(12) United States Patent
Bramson et al.

(10) Patent No.: US 6,307,297 B1
(45) Date of Patent: Oct. 23, 2001

(54) RECESSED ALTERNATOR POLE PIECE

(75) Inventors: Eric David Bramson, Ann Arbor; Michael Timothy York, Chelsea, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/565,778

(22) Filed: May 5, 2000

(51) Int. Cl.[7] .............................. H02K 9/06; H02K 19/22
(52) U.S. Cl. .................................................. 310/263; 310/42
(58) Field of Search .............................. 310/261, 42, 263, 310/67 R, 91, 181; 29/596–598

(56) References Cited

U.S. PATENT DOCUMENTS

| | | |
|---|---|---|
| 2,950,401 | 8/1960 | Evans . |
| 4,614,889 * | 9/1986 | Ikegami et al. ................. 310/263 |
| 5,132,581 | 7/1992 | Kusase . |
| 5,325,003 * | 6/1994 | Saval et al. ..................... 310/263 |
| 5,329,199 | 7/1994 | Yockey et al. . |
| 5,361,011 | 11/1994 | York . |
| 5,382,862 * | 1/1995 | Ward et al. ..................... 310/263 |
| 5,796,201 | 8/1998 | Kamitani . |
| 5,828,155 | 10/1998 | Adachi et al. . |

* cited by examiner

Primary Examiner—Tran Nguyen
(74) Attorney, Agent, or Firm—John Kajander

(57) ABSTRACT

A rotor member and vehicle alternator mechanism. Annular recesses and ridges are provided in the back iron or bodies of the pole pieces of the rotor member. The power output of the alternator mechanism is increased and the alternator has improved support for the claw fingers for increased RPM capability.

3 Claims, 2 Drawing Sheets

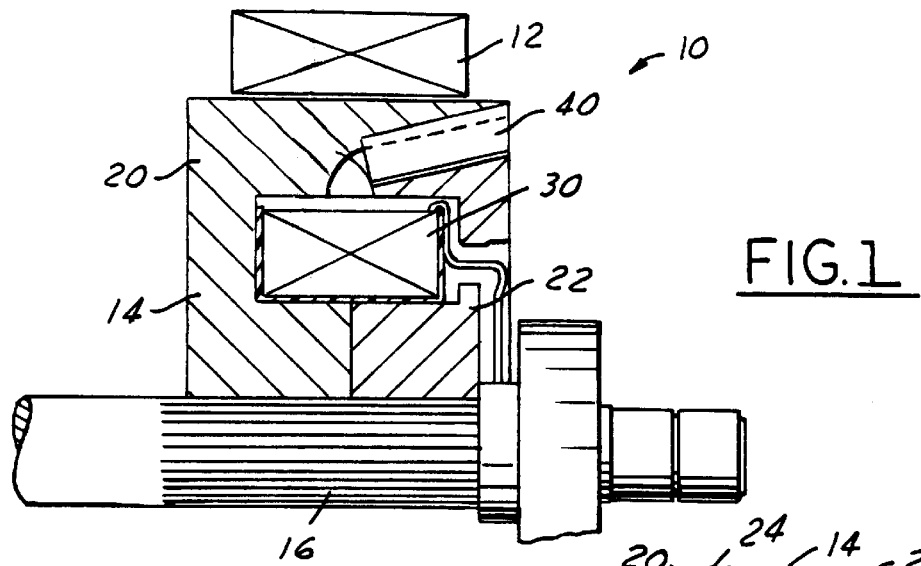
FIG. 1
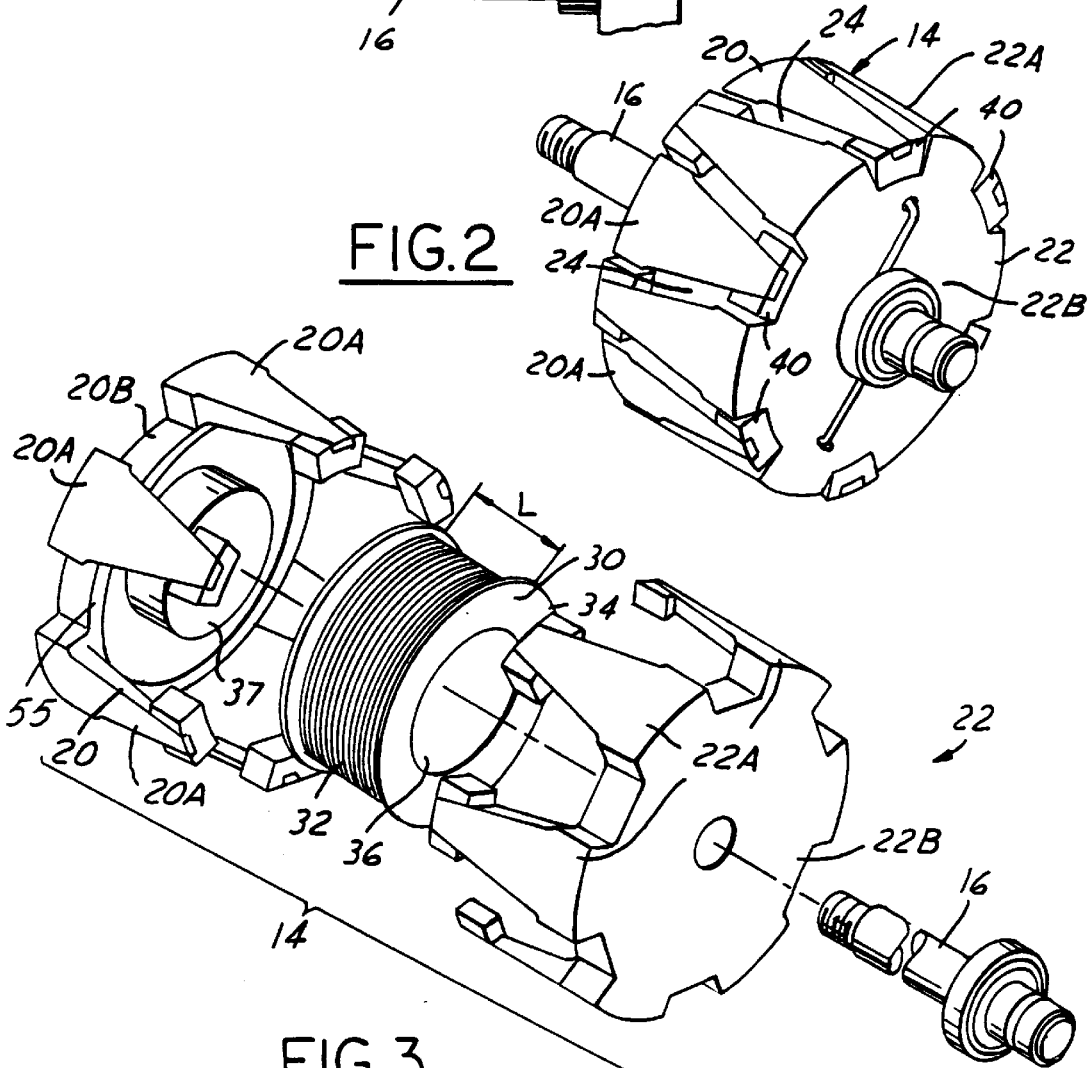
FIG. 2
FIG. 3

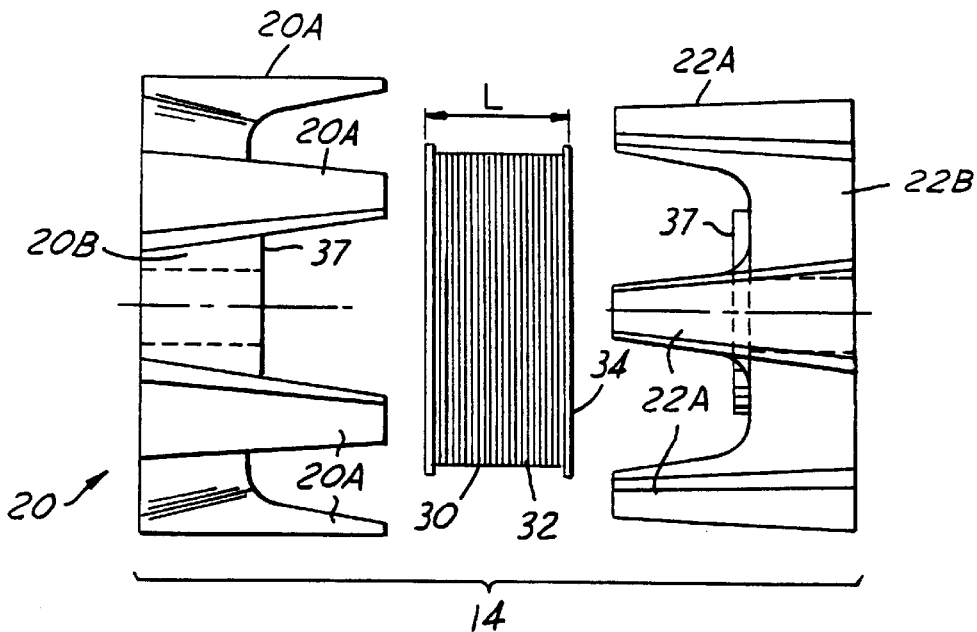
FIG. 4
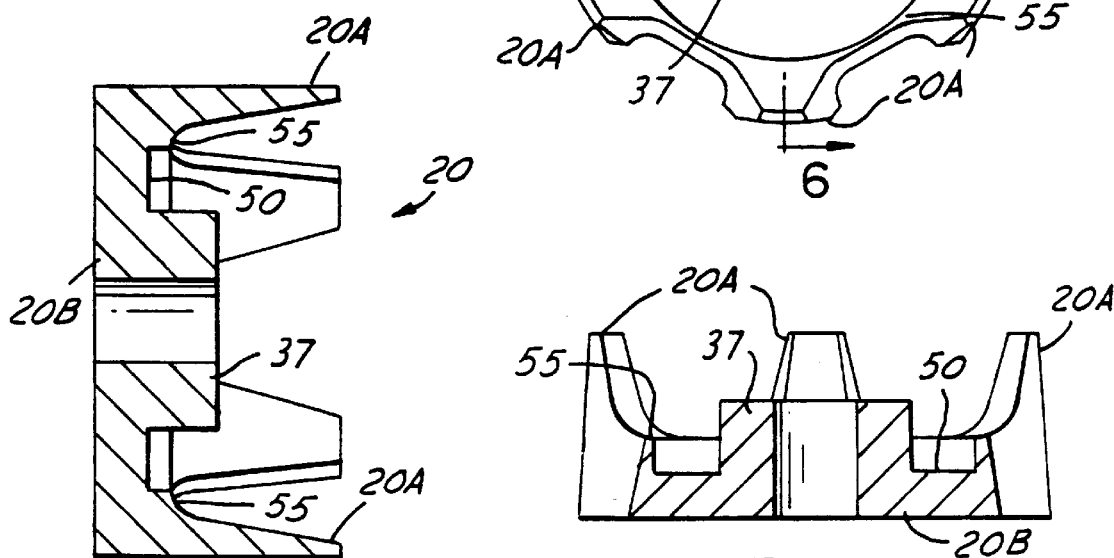
FIG. 5
FIG. 6
FIG. 7

RECESSED ALTERNATOR POLE PIECE

TECHNICAL FIELD

The present invention relates to improved rotor members for alternator mechanisms.

BACKGROUND

Conventional alternators for vehicles include stator members and rotor members, together with rectifiers and other components, all mounted in a housing. The stator member is fixedly mounted in the housing member and the rotor member is rotatably mounted on a shaft inside the stator. One or more bearing members are used to facilitate rotation of the rotor.

Rotor members with claw pole designs have two pole pieces have claw fingers positioned around a rotor coil. The claw fingers of the two pole pieces are interleaved together in the rotor member and permanent magnets are positioned on, between, or adjacent the claw fingers and secured thereto. The rotor field coil comprises a wire winding on a bobbin.

The magnets in the rotor members are positioned to provide additional magnetic field sources that aid the field coil and prevent flux leakage between the claw fingers. The overall length of the alternator can be a primary consideration in the design and development relative to the particular vehicle and vehicle engine space requirements. In reducing the axial length of an alternator, however, sacrifices typically need to be made in the length of the rotor coil or in the stiffness of the claw fingers. Shortening the rotor coil can reduce the power output of the alternator, however, and lengthening the claw fingers may allow them to flex outwardly during high speed rotation and make undesirable contact with the stator member.

Thus, it is desirable to provide an alternator rotor member which does not reduce the power output of the alternator, or result in claw fingers which could contact the stator during rotation.

SUMMARY OF THE INVENTION

It is an object of the present invention to provide an improved alternator mechanism. It is also an object of the present invention to provide an improved rotor member for an alternator mechanism.

It is a further object of the present invention to provide an improved rotor member for an alternator mechanism which has a reduced axial length. It is a still further object of the present invention to provide an improved rotor member for an alternator which has a-shortened axial length and does not have a reduced power output or significant length of unsupported claw fingers without sufficient stiffness to prevent outward deflection during rotation.

These and other objects, purposes, and advantages of the invention are provided by the following invention, which is described below and further disclosed and described in the attached drawings and appended claims.

In accordance with the present invention, a rotor member for a vehicle alternator mechanism is provided which has a shortened axial length without a reduced power output or stiffness of the claw fingers. Each of the pole pieces minimizes the unsupported length of the claw fingers and still allows the claw members to have sufficient length to allow the alternator mechanism to provide the necessary power output. An annular channel or recess is provided in the back iron of the pole pieces in order to allow a wider coil than what would normally be utilized. A ridge or ring of metal material surrounding the channel provides support for the claw fingers and enhanced high speed rotational capability.

The present invention also provides a large surface area on the pole piece, below the magnets to provide sufficient metal for the flux from the magnets and allow relatively large magnets to be used in the design. Additionally, the close proximity of the inside diameter of the channel with the outside diameter of the field coil provides for a heat transfer surface in which the heat generated by the field coil can transfer to the cooler pole piece.

Further features and details of the invention are disclosed below in the accompanying description, attached drawings, and appended claims.

BRIEF DESCRIPTION OF THE DRAWINGS

A more complete appreciation of the present invention and many of its advantages will be readily obtained as they become better understood by reference to the following detailed description when considered in connection with the accompanying drawings and detailed specification.

FIG. 1 is a partial cross-sectional view of a rotor and stator mechanism for a vehicle alternator.

FIG. 2 is a perspective view of a rotor member, in accordance with the present invention.

FIG. 3 is a perspective exploded view of the rotor member shown in FIG. 2.

FIG. 4 is an exploded elevational view of the rotor member shown in FIGS. 2 and 3.

FIG. 5 is an elevational view of a pole piece in accordance with the present invention.

FIGS. 6 and 7 are cross-sectional views of the pole piece shown in FIG. 5, the cross-sections being taken along lines 6—6 and 7—7, respectively, and in the direction of the arrows.

DESCRIPTION OF THE PREFERRED EMBODIMENT(S)

Having generally described the present invention, a further understanding can be obtained by reference to the specific preferred embodiments which are provided herein for purposes of illustration only and are not intended to limit the scope of the appended claims.

FIG. 1 is a partial cross-sectional view of an alternator rotor and stator mechanism 10. The mechanism 10 includes an annular stator member 12 which is positioned in an alternator housing (not shown) and a rotor mechanism 14. The rotor mechanism is rotatably mounted on a splined shaft 16 which is typically driven by means of a belt from the crankshaft of the motor.

The rotor member or mechanism 14 includes two substantially identical pole pieces 20 and 22 which are interleaved and secured together (as shown in FIGS. 2 and 3). The pole piece 20 includes a plurality of claw finger members 20A positioned around its periphery, while pole piece 22 includes a plurality of claw fingers 22A which are similarly positioned around its circumference or periphery. The claw fingers extend axially from the back iron or body portions 20B and 22B, respectively, of the two pole pieces 20 and 22. As shown, there typically are six claw fingers in each pole piece. The claw fingers are evenly spaced around the periphery of the pole pieces and extend axially in the manner shown in the drawings. The pole fingers typically have triangular or wedge-shaped configurations so that appropriately sized gaps 24 are provided when the two pole pieces are mated together (as shown in FIGS. 1 and 2).

The pole pieces are preferably made from an iron or steel material.

A rotor coil member 30 is positioned in the rotor member 14 between the two pole pieces 20 and 22. The coil member 30 includes a winding of copper wire 32 around a bobbin or support member 34. The rotor coil 30 has a central opening 36 which allows access for the shaft member 16 and placement around hub member 37.

When the rotor member is assembled, the two pole pieces 20 and 22 are assembled together as shown in FIG. 2 with the claw fingers 20A and 22A interleaved together. Gaps 24 are left between the two sets of pole claw fingers.

Permanent magnets 40 are disposed beneath the claw fingers and between the claw fingers and the rotor coil 30. (For simplicity and ease of presentation, the magnets 40 are not shown in FIGS. 4–7.) Preferably, the magnets are located near the tips of each of the pole claw fingers and held in place by an epoxy adhesive. Also preferably, the magnets 40 do not extend beyond the pole claw fingers. Magnets 40 are thus supported by solid iron magnetic circuits on both sides thereof which provide the requisite flux conducting path.

As shown in FIGS. 5–7, an annular recess or channel 50 is provided in the body or back iron of each of the pole pieces 20 and 22. The annular channels 50 are dimensioned such that the two sides of the rotor coil 30 are fit within them when the two pole pieces are assembled together forming the rotor member 14. This allows the rotor member to have a shorter axial length and still maintain an appropriate length L of the rotor coil 30 for sufficient flux and power output of the alternator mechanism. A shorter rotor member also leads to a shorter alternator mechanism which often is needed for packaging considerations.

With the recess 50, an annular metal ridge or ring 55 is provided adjacent the bases of each of the pole claw fingers 20A and 22A. This minimizes the unsupported length of the pole claw fingers and prevents them from flexing outwardly and making contact with the stator member when the rotor member 14 is rotated at high speeds.

Providing an alternator mechanism which has a reduced axial length can be a key characteristic of package size and design and can offer advantages in fitting some engines into vehicles.

The present invention offers significant advantages for reducing the axial length of the rotor member 14 and thus the overall length of the alternator mechanism 10. The position of the magnets between the underside of the tips of the claw fingers and the opposite pole's knuckle area prevents a significant amount of flux leakage between the two metal surfaces, allowing the two areas to be overlapped without reducing performance.

Increasing the stiffness of the pole claw fingers can be accomplished by merely reducing the length L of the rotor coil and replacing it with a thicker back iron on the pole piece. However, this significantly reduces the power output of the alternator. This is due to the fact that a smaller field coil contains less copper wire and produces less flux to add to the flux created by the magnets and produce the output in the alternator.

The present invention allows the unsupported length of the claw fingers to be minimized while still allowing the length of the rotor coil to remain sufficient for sufficient power output of the alternator. In this regard, the rotor coil is recessed into the back iron of the pole pieces on the order of 5–10 mm. The channels 50 are formed in the back irons of each of the pole pieces so that portions of the rotor coil 30 can fit into them, thereby allowing a wider or longer coil than could normally be used. An annular ridge or ring of metal 55 is formed surrounding the channel. The ridge or ring 55 supports the pole claw fingers and provides for good high speed rotation capability. The annular ring 55 also provides a large surface for the lower side of the magnets to contact thus providing a path for the flux and allowing relatively large magnets to be used in the rotor mechanism. Additionally, the close proximity of the inside diameter of the channels 50 with the outside diameter of the field coil 30 provides for heat transfer surfaces in which the hot field coil can transfer heat to the cooler pole pieces.

The channel 50 in the radially extending flat body portions (back iron) of the pole pieces also reduces the thickness of that portion and in turn reduces the mass of the rotor member. This allows the use of additional windings (up to 20–40%) to be added to the field coil which in turn increases the power output of the alternator mechanism a significant amount.

With the configuration shown in the drawings, the magnets and rotor coil are in radial alignment. The deeper placement of the rotor coil into the back irons of the pole pieces, together with placement of the magnets on the claw fingers, provides for such an alignment. The rotor coil under the magnets is separated by the annular ridge 55 that supports the claw fingers and magnets.

The present invention provides a rotor member and alternator mechanism that is significantly shorter than the current permanent magnet rotors and alternators without sacrificing output power. The present invention also provides an alternator that improves high RPM capability. The present invention also provides a large magnet contact area without sacrificing the size of the field coil. Finally, by placing the inside diameter of the channel in close proximity with the outside diameter of the field coil winding, heat transfer from the field coil to the pole piece is enhanced.

The present invention can be utilized with any type of alternator member known today. For example, the present invention can be used with a water-cooled permanent magnet alternator which provides for additional benefits in heat transfer and efficiency over conventional air-cooled alternator members. The present invention can also be used with standard air-cooled alternators and conventional alternators with or without permanent magnets.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A rotor member for an alternator comprising a rotor coil and a pair of pole pieces, each of said pole pieces having a base member, a plurality of axially extending claim fingers and an annular ridge member, the base member of at least one of said pole pieces having an annular channel therein for positioning of the rotor coil therein, and said annular ridge member surrounding said channel and positioned on the base of said claw fingers for reducing the unsupported length of said claw fingers.

2. An alternator for a vehicle, said alternator having a rotor member and stator member positioned inside a housing, the rotor member having two pole piece, each with body members and a plurality of axial extending claw fingers, the claw fingers being interleaved together, the rotor member having magnets positioned on or under each of said claw fingers and having a rotor coil positioned between the pole pieces, the improvement comprising channel means in the body members of each of said pole pieces for holding a portion of said rotor coil and an annular ridge means adjacent said channel means and at the base of said claw fingers for supporting and stiffening said claw fingers.

3. The alternator for a vehicle as recited in claim 2 wherein said magnets are positioned in radial alignment with said rotor coil.

* * * * *